Feb. 26, 1963 — C. D. DOSKER — 3,079,026
INSULATED SPACE AND ELEMENTS EMPLOYED THEREIN
Filed June 25, 1958

INVENTOR.
Cornelius D. Dosker
BY
Dawes, McDougall, Williams & Kersh
Attorneys 3,079,026
INSULATED SPACE AND ELEMENTS
EMPLOYED THEREIN
Cornelius D. Dosker, Louisville, Ky., assignor, by mesne assignments, to Conch International Methane Limited, Nassau, Bahamas, a corporation of the Bahamas
Filed June 25, 1958, Ser. No. 744,426
8 Claims. (Cl. 220—9)

This invention relates to the fabrication of an insulated space of large dimension for use in the storage or transporation of a material which needs to be maintained at a temperature differing widely from ambient temperature and it relates more particularly to insulation panels of large dimension and their use in the fabrication of an insulated space which can be employed as a primary container or as an insulated housing in which self-sufficient containers may be installed for the storage of a cold liquid.

It is an object of this invention to produce and to provide a method for producing an insulated space of the type described which is capable of use under widely varying temperature conditions including extremely cold temperatures.

These and other objects and advantages of this invention will hereinafter appear and for purposes of illustration, but not of limitation, an embodiment of the invention is shown in the accompanying drawing in which—

Figure 1:
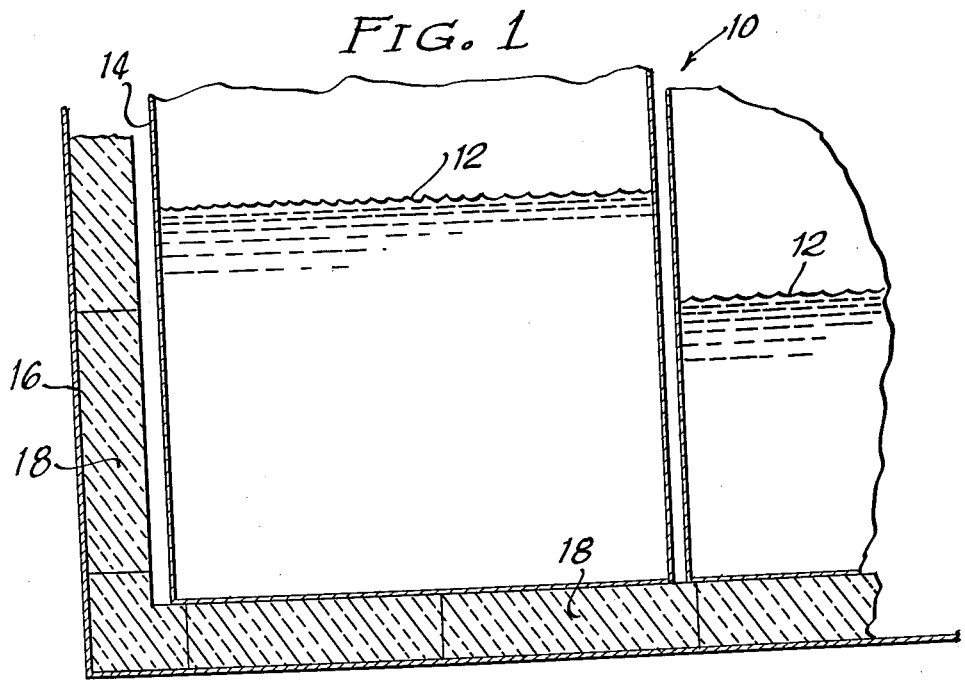
Figure 2:
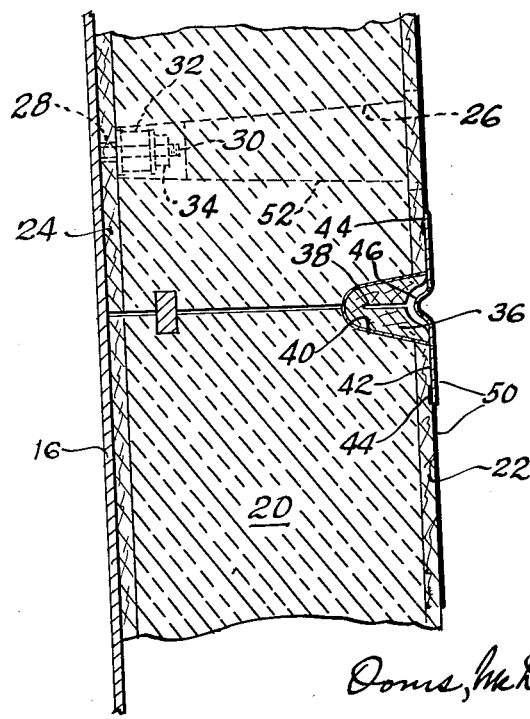

FIGURE 1 is a schematic elevational view of an insulated space embodying the features of this invention, and FIGURE 2 is an enlarged sectional elevational view of the insulation in position of use and illustrating the features of this invention.

In my copending application Ser. No. 646,001, filed March 14, 1957, description is made of an insulated space 10 of large dimension for the storage of a cold boiling gas, such as liquefied gas 12, in metal tanks 14 at a temperature of about −250° F. The wall 16 defining the storage space 10, as represented by the inner hull formed about the hold space of a ship, is used on supporting walls on which modular insulation panels 18 are independently mounted in end-to-end and in side-by-side relation to provide a substantially continuous insulation lining about the hold space.

The panels are prefabricated to the desired dimension, such 4 x 8 or 8 x 8 feet, with a relatively thick central section 20 of a structurally strong, dimensionally stable, highly porous insulation material as represented by interbonded slabs of balsa wood or a honeycomb construction formed of resinous treated paper or corrugated veneer. The insulation section is faced on its front and back surfaces with plywood sheets 22 and 24 respectively formed of hardwood plies adhesively bonded to the insulation section to provide a modular panel 18.

Various means can be employed for mounting the panels for independent support on the wall 16. In the illustrated modification of the aforementioned copending application, a plurality of openings 26 are provided through the thickness of the panel with the opening 28 through the back plywood panel 24 being of smaller dimension than the remainder. After the panel is properly positioned relative to the supporting wall 16, Nelson studs 30 are inserted through the openings and welded to the aligned portions of the wall 16 so that the studs will extend part way into the openings. Resilient washers 32 larger than the opening 28 but smaller than the remainder of the openings 26 are inserted onto the stud in combination with a nut member 34. The latter is thereafter turned down onto the threaded end portion of the stud to bring the washer into pressing engagement with the inner face of the back panel with a force sufficient to hold the panel firmly onto the wall.

A wooden spline 36, having a kerf 38 extending lengthwise through a central portion thereof is inserted into receiving grooves 40 in the linear edges between adjacent panels to provide an interconnecting relation. The side walls of the spline are adhesively bonded to the adjacent walls of the panel to effect an assembled relation so that the space between the panels will be blocked.

To effect a sealing relationship between the panels, use is made of expansion strips 42 in the form of a resinous sheet preferably reinforced with glass fibers. The strip is dimensioned to have a width greater than the spaced relation between the panels so that the opposite edges 44 of the strip will overlie the linear edge portions of adjacent panels and a sealing relationship is established therebetween by the use of an adhesive. The expansion strip 42 is formed with corrugated sections in the form of a bulbous portion 46 extending lengthwise through the central portion thereof to permit expansion and contraction in the cross wise direction responsive to relative movements between adjacent panels as a consequence of expansions and contractions which take place therein due to temperature change. For the same purpose, it is desirable also to make use of corner expansion joints in the form of a corrugated conically or hemispherically shaped section having edge portions which extend for a distance to overlap the panels making up the corner section to enable a sealing relationship to be established therewith. The bulbous portion of the linear expansion strip and the bulbous portion of the corner expansion strip are adapted to be received in unbonded relationship in suitable recesses formed between the panels or in the spline in the event that the latter is used.

By way of an example of the temperature change which may take place, when the material to be housed within the insulating space comprises liquefied natural gas at atmospheric pressure, the liquid has to be maintained at a temperature of about −250° F. When the liquid is removed or when the panels are first installed, the panel may rise to a temperature corresponding to about ambient temperature thereby to provide for a temperature change which may be as great as 350° F. At least in the portions of the panels adjacent the storage space, such changes in temperature will cause considerable expansion and contraction to increase or decrease the spaced relationship between the panels.

It will be apparent that the expansion members will be subjected to repeated cycles of expansion and contraction which, under conditions of use, may lead to failure of one or more of the elements due to fatigue or to cracking, separations or the like.

Thus it is desirable to be able to improve upon the durability of the elements employed in building up the insulated space.

In accordance with the practice of this invention, the fatigue and durability characteristics of the elements making up the insulation lining are improved by metalizing the inner facing of the lining by a spray technique to provide a continuous layer 50 of a metal on the exposed surfaces of the panels and the interconnecting expansion joints to provide a substantially continuous facing layer of metal all about the insulation space. Metallic spray coating processes are well known to the art and devices for spraying metal while reduced to a molten state to provide a continuous metalized surface bonded to the underlying support are also well known.

It is preferred to metalize the surface with a thick layer of stainless steel which imparts good flexibility and durability under the extremely cold temperatures of use. Aluminum and alloys of aluminum can be used but such metals are more difficult to apply. Though not equivalent, use can also be made of copper or other metal which retains its ductility at low temperature.

Application of the metal coating 50 can be made onto the inner faces of the separated panels prior to their installation if a continuous surface is presented, as when means other than the type described are employed for mounting the panels on the wall. It is preferred, however, to spray coat the inner surfaces of the lining after all of the elements have been mounted in place, including the insertion of a wooden plug 52 to fill the opening 26 in the panels, so as to provide continuity in the metal layer. Under such circumstances, the metalized lining would be capable of use as a primary container for housing the cold liquid since the surfaces of the lining would be vapor and fluid impervious. It is preferred, however, to make use of separate metal tanks housed within the insulated space for containing the cold liquid. Under such circumstances, the metalized insulation lining would serve as a secondary container to hold the liquid in the event that such liquid should come into contact therewith. Thus the lining which embodies improved fatigue and durability characteristics would also provide for additional protection.

By way of a preferred modification, it is desirable to make use of expansion strips and corner expansion strips formed of stainless steel in combination with the metalized surfaces of the panels. Thus, metal to metal joinder can be effected which provides for a better and more permanent sealing relationship. The expansion strip of stainless steel provides better durability and stands up under repeated cycling as effected by relative movements between the panels in expansion and contraction in response to the cycles of temperature change. While stainless steel is preferred for the expansion strip, other metals capable of retaining their ductility at low temperature can also be used for the expansion strip, such as aluminum, alloys of aluminum, and copper. With a metal expansion strip, the metal coating 50 need only be provided on the inner faces of the panels 18 but it is preferred to spray the entire lining after assembly to insure continuity in the metal coating and the development of a sealing relationship between the elements.

To overcome any porosity that may exist in the metalized surface 50, it is desirable to overcoat the metal with a wax, such as a microparaffin wax, synthetic wax or the like, or a resinous film-forming material, all of which are selected to be stable at the temperature conditions existing and insoluble in or unaffected by the liquefied hydrocarbon gas.

In a somewhat related concept, the metalized film can be replaced by a layer 50 of a synthetic resinous material which can be applied as an after coating by a spray process, roller coating process or the like, to form a substantially continuous phase. The resinous layer can be formed of a material capable of being deposited to form a continuous layer and it should be characterized by liquid imperviousness, freedom from attack by the liquefied hydrocarbon gases, insolubility in the liquefied hydrocarbon, and resiliency or flexibility even under the extreme cold temperature conditions to which it will be exposed. To the present, the polyethylene plastics including polytetrafluoroethylene and the like polyethylene derivative polymers and halogenated polyethylenes are suitable for this purpose. Other resinous materials and polymers meeting the desired qualifications can be selected of presently known materials or of materials which will hereinafter be developed by the synthetic resinous art and the elastomer art.

It will be understood that changes may be made in the details of construction, arrangement and operation without departing from the spirit of the invention, especially as defined in the following claims.

I claim:

1. In an insulated space of large dimension for use in the storage and/or transportation of a material which needs to be maintained at a temperature differing widely from ambient temperature, supporting walls defining the space to be insulated, a plurality of individual, prefabricated, modular panels of insulation material, means mounting the panels on the walls in end-to-end and in side-by-side relation substantially completely to cover the walls so that the panels are free to move in the direction toward and away from each other in response to changes in dimension due to expansion and contraction, flexible sheet members in the form of expansion strips joining the inner surfaces of adjacent panels one to the other adjacent thereto in sealing relation to provide a substantially continuous lining, and a continuous layer of a metal covering the entire inner surfaces of the insulation lining to provide a fluid and vapor impervious lining about the storage space.

2. An insulated space as claimed in claim 1 in which the flexible sheet members joining the edges of adjacent panels comprise expansion strips secured at their opposite edges in sealing relationship to the linear edges of adjacent panels to effect a sealing relationship therebetween.

3. An insulated space as claimed in claim 2 in which the expansion strips comprise elongate strips having bulbous portions extending lengthwise through the central portion of the strip and in unbonded relationship to the panels to enable relative movements between the panels in expansion and contraction without breaching the sealing relationship therebetween.

4. An insulated space as claimed in claim 2 in which the expansion strips comprise fiber reinforced plastics.

5. An insulated space as claimed in claim 2 in which the expansion strips comprise a thin sheet of metal.

6. An insulated space as claimed in claim 5 in which the metal in the layer is present as a coating only on the inner faces of the panels and in which the metal expansion strips and the metal facings are joined in sealing relationship by metal joining means.

7. The method of insulating a large space defined by supporting walls for the storage and transportation of liquid which needs to be maintained at extremely low temperature comprising the steps of mounting a plurality of prefabricated insulation panels in end-to-end and in side-by-side relation on the walls substantially completely to cover the walls so that the panels are free to move in the direction toward and away from each other in response to changes in dimension due to expansion and contraction, bonding the lateral edges of sealing strips to the inner surfaces of adjacent panels to provide a substantially continuous lining, and spray coating the inner surfaces of the lining with a molten metal to provide a continuous metal layer on the insulated lining defining the storage space.

8. In an insulated space of large dimension for use in the storage and/or transportation of a material which needs to be maintained at a temperature differing widely from ambient temperature, supporting walls defining the space to be insulated, a plurality of individual, prefabricated, modular panels of insulation material, means mounting the panels on the walls in end-to-end and in side-by-side relation substantially completely to cover the walls so that the panels are free to move in the direction toward and away from each other in response to changes in dimension due to expansion and contraction and a continuous layer of a fluid impervious material characterized by insolubility in the fluid, resistance to attack by the fluid and retention of flexure at extremely low temperatures covering the entire inner surfaces of the insulation lining to provide a fluid and vapor impervious lining about the storage space.

References Cited in the file of this patent

UNITED STATES PATENTS

| | | |
|---|---|---|
| 1,320,882 | Maehler | Nov. 4, 1919 |
| 1,357,713 | Lane | Nov. 2, 1920 |
| 1,799,234 | Huff | Apr. 7, 1931 |
| 2,020,630 | Anderson | Nov. 12, 1935 |
| 2,181,074 | Scott | Nov. 21, 1939 |
| 2,537,466 | Kiefer | Jan. 9, 1951 |
| 2,806,810 | Beckwith | Sept. 17, 1957 |
| 2,859,895 | Beckwith | Nov. 11, 1958 |
| 2,889,953 | Morrison | June 9, 1959 |